(12) United States Patent
Stockmann et al.

(10) Patent No.: US 9,170,320 B1
(45) Date of Patent: Oct. 27, 2015

(54) TRANSMITTER PUSHING COMPENSATION FOR RADAR STABILITY ENHANCEMENT

(71) Applicant: Lockheed Martin Corporation, Bethesda, MD (US)

(72) Inventors: Peter H. Stockmann, Jamesville, NY (US); Jonathan Fischi, Fayetteville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 387 days.

(21) Appl. No.: 13/692,346

(22) Filed: Dec. 3, 2012

(51) Int. Cl.
*G01S 7/02* (2006.01)
*G01S 7/28* (2006.01)
*G01S 7/40* (2006.01)
*G01S 13/52* (2006.01)

(52) U.S. Cl.
CPC .............. *G01S 7/2813* (2013.01); *G01S 7/023* (2013.01); *G01S 7/40* (2013.01); *G01S 7/4008* (2013.01); *G01S 13/52* (2013.01)

(58) Field of Classification Search
CPC .......... G01S 7/34; G01S 7/40–7/4021; G01S 13/5242; G01S 13/5244
USPC .................................................. 342/159–174
See application file for complete search history.

(56) References Cited

U.S. PATENT DOCUMENTS

| | | | | |
|---|---|---|---|---|
| 3,256,520 A * | 6/1966 | Blitz | ............................. | 342/128 |
| 3,775,768 A | 11/1973 | Lisle et al. | | |
| 4,040,055 A * | 8/1977 | Donahue et al. | ............... | 342/162 |
| 4,042,924 A * | 8/1977 | Evans et al. | ................... | 342/102 |
| 4,318,099 A * | 3/1982 | Hsiao | ............................. | 342/160 |
| 4,325,138 A * | 4/1982 | Zscheile, Jr. | ................... | 375/130 |
| 4,532,518 A * | 7/1985 | Gaglione et al. | .............. | 342/372 |
| 4,725,842 A * | 2/1988 | Mayberry | ...................... | 342/198 |
| 4,783,660 A * | 11/1988 | Pierce | ............................ | 342/101 |
| 4,851,853 A * | 7/1989 | Mahoney | ....................... | 342/174 |
| 4,940,985 A * | 7/1990 | Taylor et al. | .................... | 342/174 |
| 4,968,968 A * | 11/1990 | Taylor | ............................ | 342/174 |
| 4,994,813 A * | 2/1991 | Shiramatsu et al. | ........... | 342/360 |
| 5,023,618 A * | 6/1991 | Reits | .............................. | 342/128 |
| 5,053,777 A | 10/1991 | Peyrat | | |
| 5,124,708 A * | 6/1992 | Mackes et al. | ................. | 342/174 |
| 5,329,284 A * | 7/1994 | Groenenboom et al. | ...... | 342/132 |
| 5,412,414 A * | 5/1995 | Ast et al. | ........................ | 342/174 |
| 5,530,449 A * | 6/1996 | Wachs et al. | ................... | 342/174 |
| 5,559,519 A * | 9/1996 | Fenner | .......................... | 342/174 |
| 5,682,165 A * | 10/1997 | Lewis et al. | .................... | 342/174 |
| 5,861,837 A * | 1/1999 | Richardson et al. | ........... | 342/198 |
| 5,969,667 A * | 10/1999 | Farmer et al. | .................. | 342/165 |
| 5,990,824 A | 11/1999 | Harrison | | |
| 5,999,120 A * | 12/1999 | Yamada | ......................... | 342/174 |
| 6,127,966 A * | 10/2000 | Erhage | .......................... | 342/174 |
| 6,339,399 B1 * | 1/2002 | Andersson et al. | ............ | 342/372 |
| 6,392,598 B1 * | 5/2002 | Jones et al. | ..................... | 342/442 |
| 6,747,595 B2 * | 6/2004 | Hirabe | ........................... | 342/174 |

(Continued)

*Primary Examiner* — Peter Bythrow
(74) *Attorney, Agent, or Firm* — Howard IP Law Group, PC

(57) ABSTRACT

A method of compensating for transmitter instability of a radar system is provided. The method includes the steps of transmitting at least one electromagnetic pulse and directly measuring at least one characteristic of the transmitted pulse. A comparison is made between the at least one measured characteristic of the transmitted pulse to a reference pulse characteristic. The results of this comparison are used to generate a complex weight for the at least one electromagnetic pulse. The weight is applied to the received return of the at least one electromagnetic pulse.

20 Claims, 4 Drawing Sheets

(56) References Cited

U.S. PATENT DOCUMENTS

| | | |
|---|---|---|
| 7,091,906 B2* | 8/2006 | Chevalier et al. .............. 342/368 |
| 7,205,936 B2* | 4/2007 | Park et al. ..................... 342/368 |
| 7,903,024 B2 | 3/2011 | Tietjen et al. |
| 2005/0190099 A1* | 9/2005 | Nagasaku ..................... 342/149 |
| 2006/0273952 A1* | 12/2006 | Krikorian et al. ............. 342/198 |
| 2008/0036649 A1* | 2/2008 | Lyon ............................. 342/174 |
| 2008/0246649 A1* | 10/2008 | Backes et al. ................. 342/165 |
| 2010/0073218 A1 | 3/2010 | Stockmann |

* cited by examiner

TRANSMITTER PUSHING COMPENSATION FOR RADAR STABILITY ENHANCEMENT

FIELD OF THE INVENTION

The present invention relates to signal processing systems and methods for use in radar applications, and more particularly, to systems and methods for compensating for transmitter instability in radar systems.

BACKGROUND

Radar systems used to detect the presence, position, and other characteristics of both natural and man-made objects are critical to both civilian and military operations. These systems typically transmit "beams" or electromagnetic (EM) signals toward targets, and process reflected return signals (or echoes) for object identification and characterization. The presence of clutter in these return signals creates a significant technical challenge in accurately processing return signals. This clutter decreases radar performance by hindering the system's ability to detect targets and/or increases the probability of a false target detection.

The negative effects of this received clutter can be reduced by the radar system's ability to produce multiple coherent pulses. This radar "stability" includes the radar transmitter's ability to generate uniform pulses that have consistent amplitude and phase from pulse to pulse. In particular, in current moving target indicator (MTI) radar systems, for example, pulses received from the target are delayed in time until the arrival of a second pulse. The first delayed pulse is then subtracted from the second pulse. As a result, stationary clutter is cancelled, and a moving target is more readily identifiable. However, the effectiveness of these clutter reduction methods is limited by the degree to which the transmitted pulses within a coherent interval do not perfectly replicate one another (i.e. instability). For example, when a transmitter power supply voltage changes from pulse to pulse (transmitter "push"), phase and amplitude modulations are produced in the signal, thus degrading clutter cancellation. This is particularly the case when the pulse repetition frequency (PRF) changes from coherent interval to coherent interval. This instability is often difficult to detect and isolate. As a result, clutter rejection requirements of modern radar systems can impose very strict pulse-to-pulse stability requirements on the radar system's electronics, which can considerably increase system cost.

Attempts have been made to address these problems by extracting or compensating the pushing factor from large clutter returns. More specifically, amplitude and phase data from these returns obtained from clutter processing are used to create compensation factors which adjust weights applied during Doppler processing. Such techniques have several drawbacks. For example, they utilize average pushing errors, and thus averaged cancellation factors to reduce clutter based errors, target contamination errors, and antenna motion errors, despite the fact that these errors actually vary pulse-to-pulse.

Accordingly, alternative methods and systems for increasing transmitter stability in a radar system are desired.

SUMMARY

In an embodiment of the present disclosure, a compensated radar system is provided. The system includes a transmitter for generating bursts of pulses with a different PRF per coherent interval, a receiver, an antenna operatively coupled to the transmitter and the receiver, and a processor operatively connected to the output of the receiver. A reception channel of the system directly measures transmitted pulses from the output of the transmitter across a number of PRFs via a coupler. Amplitude and phase comparisons are made between each pulse in a coherent interval and the last pulse in a coherent interval. The processor is configured to generate compensation factors of weights representing the difference between each pulse and the last pulse of the coherent interval, and apply the compensation factors to the Doppler filter weights.

DETAILED DESCRIPTION

Figure 1:
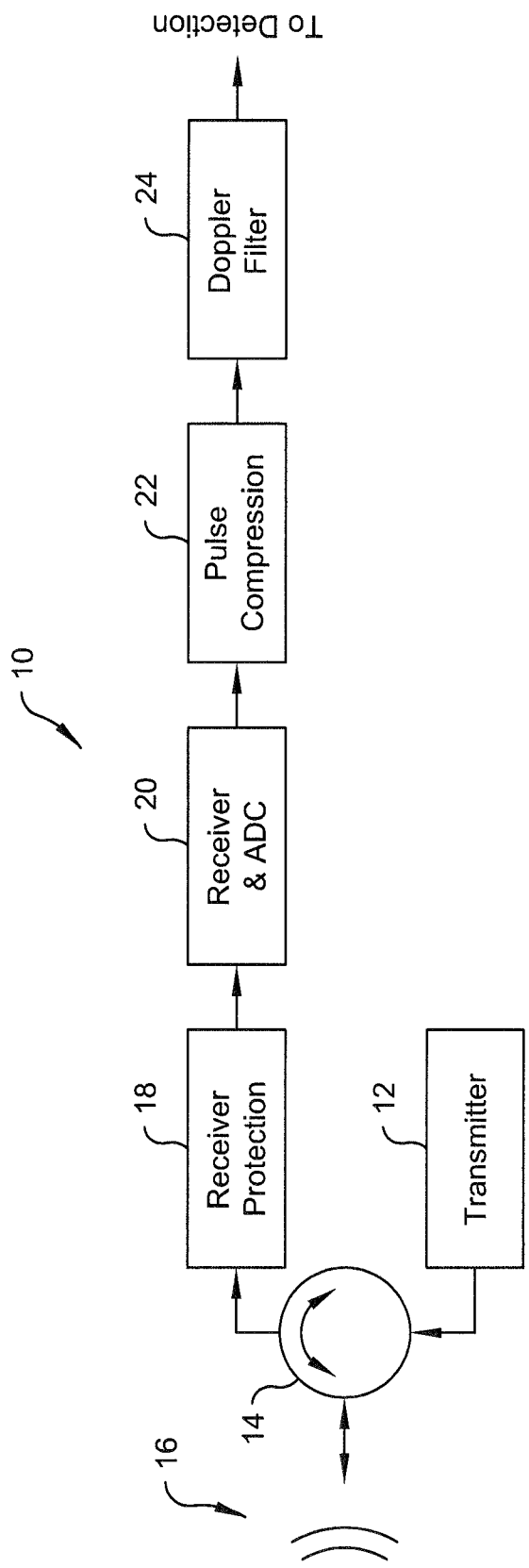
FIG. 1 is a simplified block diagram of a radar system useful for describing embodiments of the present disclosure.

It is to be understood that the figures and descriptions of the present invention have been simplified to illustrate elements that are relevant for a clear understanding of the present invention, while eliminating, for purposes of clarity, many other elements found in typical remote sensing systems, such as pulse and pulse-Doppler radar systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

As set forth above, transmitter push is typically the largest detrimental factor affecting the stability of modern radar systems, which in turn limits the clutter cancellation capability of the system. Embodiments of the present disclosure may improve radar instability compensation by directly measuring transmitter output variations, rather than attempting to measure these characteristics in received radar returns.

Referring generally to FIG. 1, embodiments of the present invention will be described herein as implemented into an exemplary pulse-Doppler radar system. As will be understood by one of ordinary skill in the art, a pulse-Doppler system 10 may comprise a transmitter 12 for providing a series of defined pulses to an antenna 16. Return signals (reflections) from each pulse are subsequently received via antenna 16 and provided to at least one receiver 20 or front-end module for signal modulation. Receiver 20 may include, by way of example only, processing components, including one or more filters, a low-noise amplifier and a down converter, as will be understood by one of ordinary skill in the art. At least one analog to digital converter (ADC) is provided for converting received analog return signals to digital form. A circulator or switching element 14 is provided for disconnecting the transmitter to establish a path to the receiver channel between transmission and reception operations.

System 10 may also include, by way of non-limiting example, a receiver protection device 18 comprising one or more RF power limiters to block sensitive circuit components from excess RF power. Further, receiver protection device 18 may also include sensitivity time control (STC) circuits, and/or swept gain attenuators. The functionality of these devices is well-known to those of ordinary skill in the art, and thus, further description thereof has not been provided for the purposes of brevity. A pulse compression module 22 is operative to receive post-A/D digitized in-phase and quadrature-phase (I/Q) signal data from antenna 16. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain. The output of pulse compression module 22 comprises modulated data which may be subject to further processing, such as sampling the incoming data into range cells or bins, generating one sample in each range bin for each pulse. Range bin data is provided to one or more Doppler filters 24, generating a series of Doppler bins for each range cell. Data from a particular Doppler bin corresponds to a signal from a target or background, at a given range, moving at a particular speed. Once processed, return data is used for clutter reduction and detection processing, operative to, for example, perform a threshold detection process against a time-averaged background map.

Figure 2:
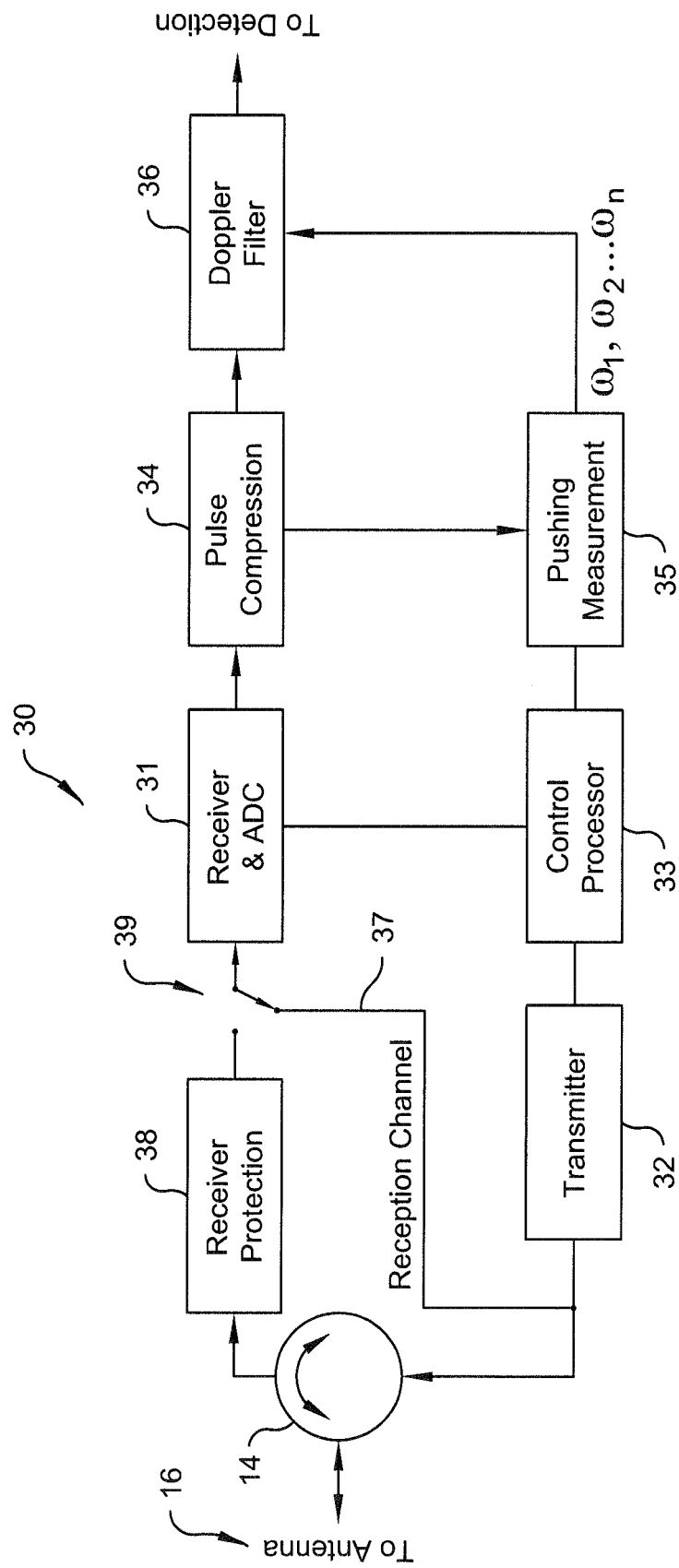
FIG. 2 is a simplified block diagram of a radar and signal processing system according to an embodiment of the present disclosure.

Referring generally to FIG. 2, a radar system 30 is provided which comprises a similar arrangement to system 10 of FIG. 1, including a transmitting channel having a transmitter 32, a circulator 14 and an antenna 16. Likewise a receiver channel is provided, including a receiver protection device 38 as well as a receiver and A/D converter 31. As set forth above with respect to FIG. 1, system 30 may include at least one pulse compression module 34 operative to receive digital return signal data from receiver 31 The output of pulse compression module 34 may be sampled and sorted into range bins by Doppler filter(s) 36, which receives the time-domain complex data streams for conversion into the frequency domain to sort data into a plurality of Doppler bins for a given range (e.g. for each range bin) prior to detection processing. System 30 further includes a separate transmission line or reception channel 37 arranged between the output of transmitter 32 and the input of receiver 31. In one exemplary embodiment, reception channel 37 may be placed in selective communication with receiver 31 via a switch 39.

Reception channel 37 is operative to transmit the output of transmitter 32 to receiver 31, facilitating the direct measurement of pulse-to-pulse amplitude and phase changes of the output of the transmitter. This may be achieved by, for example, leaving receiver 31, including ADC, in an operative state during transmission operations. Transmitted pulses which are coupled to the receiving channel are provided to the subsequent digital processing components, such as a pushing measurement computer processor 35.

Figure 3:
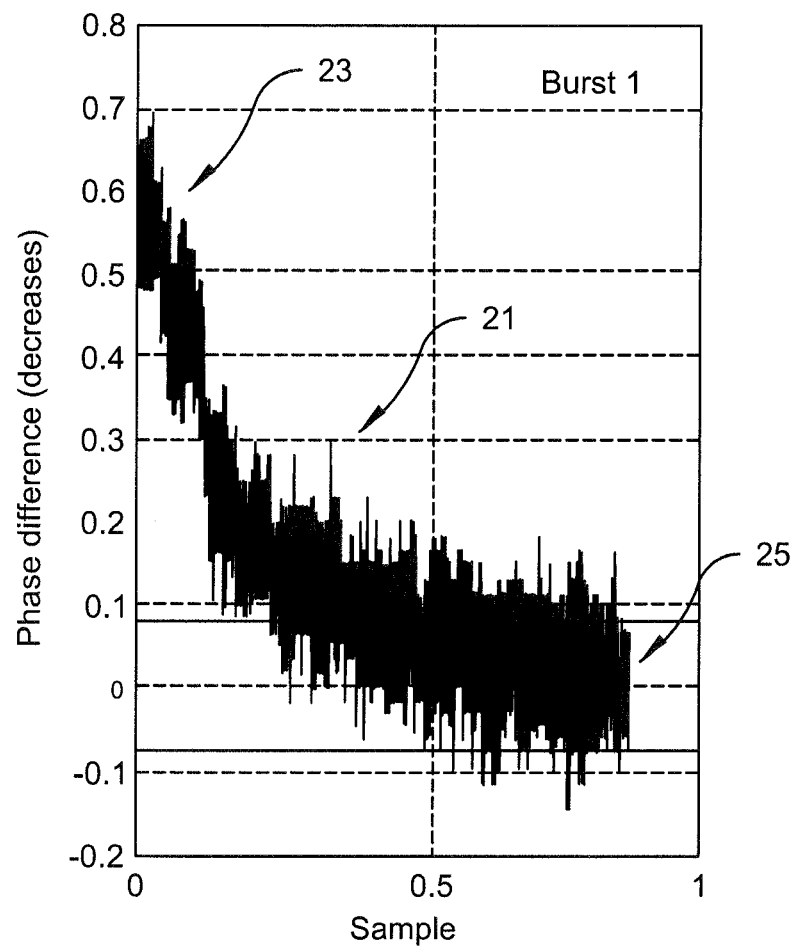
FIG. 3 is a graphical representation illustrating transmitter pushing, including pulse-to-pulse phase changes within a given multi-pulse burst.

Pushing measurement processor 35 is operative to measure transmitter push at the output of pulse compressor 34. This may include measuring variations in pulse characteristics between received transmitter output pulses in the coherent interval and a reference pulse. In one embodiment, the reference pulse may comprise the last pulse in a coherent interval. The system and method of the present disclosure utilizes the pulse settling within a burst output from the transmitter and measured directly by the receiver to provide the compensation and correction factors for reducing transmitter instability manifest in the return (reflected) signals of interest. The diagram of FIG. 3 represents the phase difference as a function of sample number for an exemplary transmitted burst 21 comprising eight pulses, which include a first pulse 23 and an eighth pulse 25. As illustrated, an exponentially decreasing phase difference between first pulse 23 and eighth pulse 25 is present as a result transmitter pushing. Pushing measurement processor 35 may utilize the eighth pulse 25 as the reference pulse for measuring the pulse-to-pulse phase (and amplitude) variations between remaining pulses 1-7.

From these measured variations, complex correction or compensation factors, or weights, $\omega_1, \omega_2 \ldots \omega_n$ may be generated, stored into memory, and subsequently applied to the Doppler filter weights corresponding to each received return pulse for significantly reducing or eliminating the negative effects of the transmitter instability. In one exemplary embodiment, the weights are computed for each pulse to compensate for amplitude and phase change between each pulse (e.g. pulses 1-7) and the last or reference pulse (e.g. pulse 8) in a coherent interval. In this way, embodiments of the present disclosure measure the pulse-to-pulse systematic variations of the radar system and removes them from subsequent processing.

In one exemplary embodiment, sampled complex I/O data associated with each of the N pulses of the transmitter output are received and their amplitudes $A_N$ and corresponding phases $e^{j\Phi_N}$ are measured by pushing measurement processor 35:

$$A_1 e^{j\Phi_1} \ldots A_N e^{j\Phi_N} \qquad \text{Eq. 1}$$

Using $A_N e^{j\Phi_N}$ as a reference pulse, a compensation vector may be calculated for each of pulse. This compensation vector may be generated by taking the complex conjugate of the sampled peak of the pulse-compressed output for each identified pulse:

$$\frac{A_N}{A_1} e^{j(\Phi_N - \Phi_1)} \ldots \frac{A_N}{A_{N-1}} e^{j(\Phi_N - \Phi_{N-1})} \qquad \text{Eq. 2}$$

Finally, a corresponding compensation vector or compensation factor may be applied to each received pulse. This may be achieved, for example, by altering the coefficients of each of Doppler filters 36 (FIG. 2). Alternatively, the compensation factors may be applied directly to the received return data prior to Doppler filtering.

Referring again to FIG. 2, a control processor 33 may be provided for controlling the functionality of the above-described embodiments. For example, control processor 33 may be used to control the on and off timing of the receiver/ADC 31. Moreover, control processor 33 (or pushing measurement processor 35) may be responsive to transmitter 32 for correlating a given transmitter output pulse transmitted over reception channel 37 with a received return pulse, as well as with a corresponding compensation factor or weight, on a pulse-by-pulse basis within a coherent interval. More specifically, for a known PRF and a known quantity of output pulses of a given pulse burst, control processor 33 may differentiate between digitized data received via receiver 31 corresponding to received reflected return signals, and transmitter output signals received via reception channel 37 (i.e. output signals associated with the zero range transmitter return). Once identified, the zero range transmitter output signals may be used to generate pushing measurements and/or correction factors, as set forth above. These correction factors are then correlated and subsequently applied to return signals corresponding to the transmitter output from which they were generated. The control processor may also determine the timing associated with computing the correction factors.

Figure 4:
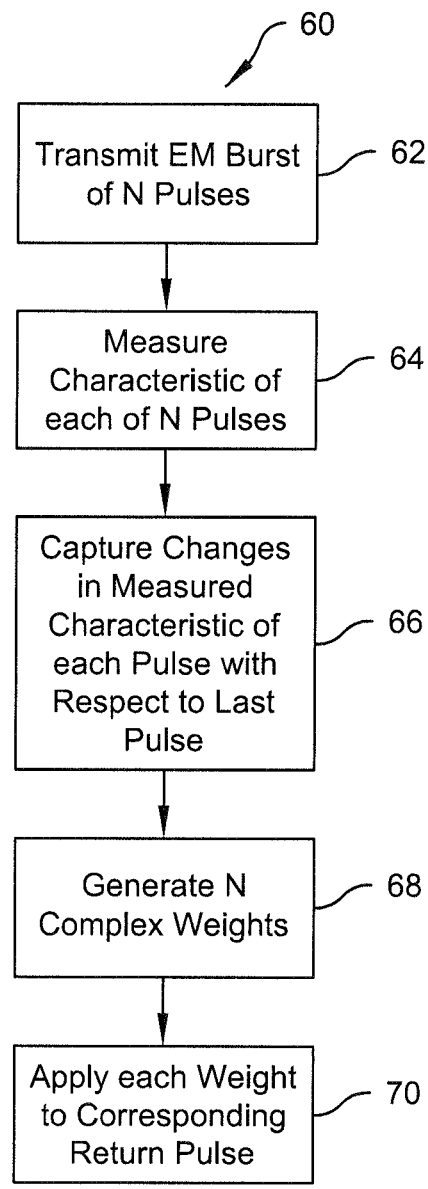
FIG. 4 is a process flow diagram illustrating an exemplary pushing compensation method according to an embodiment of the present disclosure.

FIG. 4 is a process flow diagram illustrating an exemplary stability compensation method 60 according to the present disclosure. In step 62, an EM burst is transmitted comprising N pulses. A direct measurement of characteristics (e.g. amplitude and phase) of each of the transmitted pulses is made in step 64. Step 66 includes comparing the measured characteristic of each pulse N to a reference value (e.g. the last transmitted pulse in each coherent interval). As set forth above, the results of this comparison are used to generate a compensation factor for each pulse, such as a complex weight in step 68. This weight is correlated with and applied to a received return of the transmitted pulse in order to minimize or eliminate the effects of pulse to pulse variations in subsequent clutter and detection processing. This process may or may not be performed for every transmitted signal, but rather may be performed only intermittently, such as after a change in the PRF from coherent interval to coherent interval.

It should be understood that the embodiments described herein address the weaknesses of the prior art to achieve significant improvement in overall radar system stability. In addition to computing pushing errors for each pulse, the embodiments directly measure and correct the transmitter pushing, and do not depend on a return signal. The system does not rely on a stable return on every pulse interval, or assuming that pushing is similar for each pulse and integrating an average. No clutter map-based selection is needed. The prior art requires an averaging of the clutter-based compensation factors to reduce the clutter based errors, target contamination errors and antenna motion errors. The present embodiments are free of clutter, target or antenna motion based errors and requires therefore no averaging which means that the Doppler filter can be adapted/corrected for each PRI.

It should be understood that systems and methods of the present invention may be used to reduce or eliminate the detrimental effects of instability in remote sensing systems of a variety of types, including sonar, radar, navigation and guidance systems.

The embodiments are provided by way of example only, and other embodiments for implementing the methods described herein may be contemplated by one of skill in the pertinent art without departing from the intended scope of this disclosure. For example, systems including the pushing measurement devices, may include memory containing data, which may include instructions, the instructions when executed by a processor or multiple processors, cause the steps of a method for performing the signal processing and weight creation set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

In one embodiment, the pushing hardware and software can be implemented using any real time operating system software and associated DSP hardware, an FPGA, custom hardware and software, by way of non-limiting examples only. The processor type and software must be configured such that the timing of the system can be maintained. For example, an FPGA may be implemented for the ADC portion of the control, while the weights may be implemented by a processor, such as that used by a computer running suitable software instructions.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A radar system comprising:
   a transmitter for generating a plurality of electromagnetic pulses defining a pulse burst of a given pulse repetition frequency (PRF) in a coherent interval;
   a receiver;
   an antenna operatively coupled to the transmitter and the receiver; and a first processor operatively connected to the output of the receiver, the first processor is configured to:
- measure the plurality of pulses output from the transmitter in the coherent interval,
- compare the measured pulses output from the transmitter to a reference pulse, the reference pulse being the last pulse in the coherent interval,
- generate a compensation factor representing the difference between at least one of the measured pulses output from the transmitter and the reference pulse, and
- apply the compensation factor to a return signal corresponding to the measured transmitter pulse output.

2. The system of claim 1, wherein the receiver comprises an analog to digital converter.

3. The system of claim 2, further comprising a second processor configured to control the on and off timing of the analog to digital converter.

4. The system of claim 3, wherein the second processor is configured to turn the analog to digital converter on during at least a portion of the time the transmitter is generating the pulse output.

5. The system of claim 1, wherein the pulse output of the transmitter is provided to the receiver via at least one of a direct coupling, antenna reflection, and power leakage between operating channels of the transmitter and the receiver.

6. The system of claim 1, wherein the step of generating a compensation factor includes taking the complex conjugate of the peak of the measured pulse output of the transmitter.

7. The system of claim 1, wherein the steps of measuring the pulses output from the transmitter, comparing the measured pulse output of the transmitter to a reference pulse, generating a compensation factor representing the difference between the measured pulse output and the reference pulse, and applying the compensation factor to a return signal corresponding to the measured transmitter pulse output are made for each pulse output by the transmitter.

8. A method of compensating for transmitter instability of a radar system comprising:
- transmitting a plurality of electromagnetic pulses defining a pulse burst of a given pulse repetition frequency (PRF) in a coherent interval;
- measuring at least one characteristic of a transmitted pulse in the coherent interval;
- comparing the at least one measured characteristic of the transmitted pulse to a reference pulse characteristic, the reference pulse characteristic being the last pulse in the coherent pulse interval;
- generating a complex weight corresponding to the at least one electromagnetic pulse; and
- applying the complex weight to a received return corresponding to the measured transmitted electromagnetic pulse.

9. The method of claim 8, further comprising the step of receiving the transmitted pulse with a receiving channel of the radar system.

10. The method of claim 9, wherein the transmitted pulse is received via at least one of a direct coupling, antenna reflection, and power leakage between a transmitting channel and the receiving channel of the radar system.

11. The method of claim 10, wherein the receiving channel comprises an analog to digital converter.

12. The method of claim 11, further comprising the step of activating the analog to digital converter during at least a portion of the time the transmitting channel is generating the electromagnetic pulse.

13. The method of claim 8, wherein the step of generating a compensation factor includes taking the complex conjugate of the peak of the measured transmitted pulse.

14. The method of claim 8, wherein the steps of measuring at least one characteristic of the transmitted pulse, comparing the at least one measured characteristic of the transmitted pulse to a reference pulse characteristic, generating a complex weight corresponding to the at least one measured electromagnetic pulse, and applying the complex weight to a received return corresponding to the measured transmitted electromagnetic pulse are made for each transmitting pulse of the transmission channel.

15. A radar system comprising:
- a transmitter for generating an electromagnetic pulse;
- a receiver;
- a plurality of Doppler filters coupled to the output of the receiver;
- an antenna operatively coupled to the transmitter and the receiver; and
- a first processor operatively connected to the output of the receiver, the first processor is configured to:
  - measure the pulse output from the transmitter,
  - compare the measured pulse output of the transmitter to a reference pulse,
  - generate a compensation factor representing the difference between the measured pulse output and the reference pulse, and
  - altering coefficients of the Doppler filters using the compensation factor.

16. The system of claim 15, wherein the reference pulse comprises the last pulse in a coherent interval.

17. The system of claim 15, wherein the step of generating a compensation factor includes taking the complex conjugate of the peak of the measured pulse output of the transmitter.

18. The system of claim 15, further comprising a second processor configured to control the on and off timing of an analog to digital converter of the receiver.

19. The system of claim 18, wherein the second processor is configured to turn the analog to digital converter on during at least a portion of the time the transmitter is generating the pulse output.

20. The system of claim 15, wherein the steps of measuring the pulse output from the transmitter, comparing the measured pulse output of the transmitter to a reference pulse, generating a compensation factor representing the difference between the measured pulse output and the reference pulse, and altering coefficients of the Doppler filters using the compensation factor are made for each pulse output by the transmitter.

* * * * *